(No Model.)
H. J. GILBERT.
DRIVE CHAIN.
No. 454,998. Patented June 30, 1891.
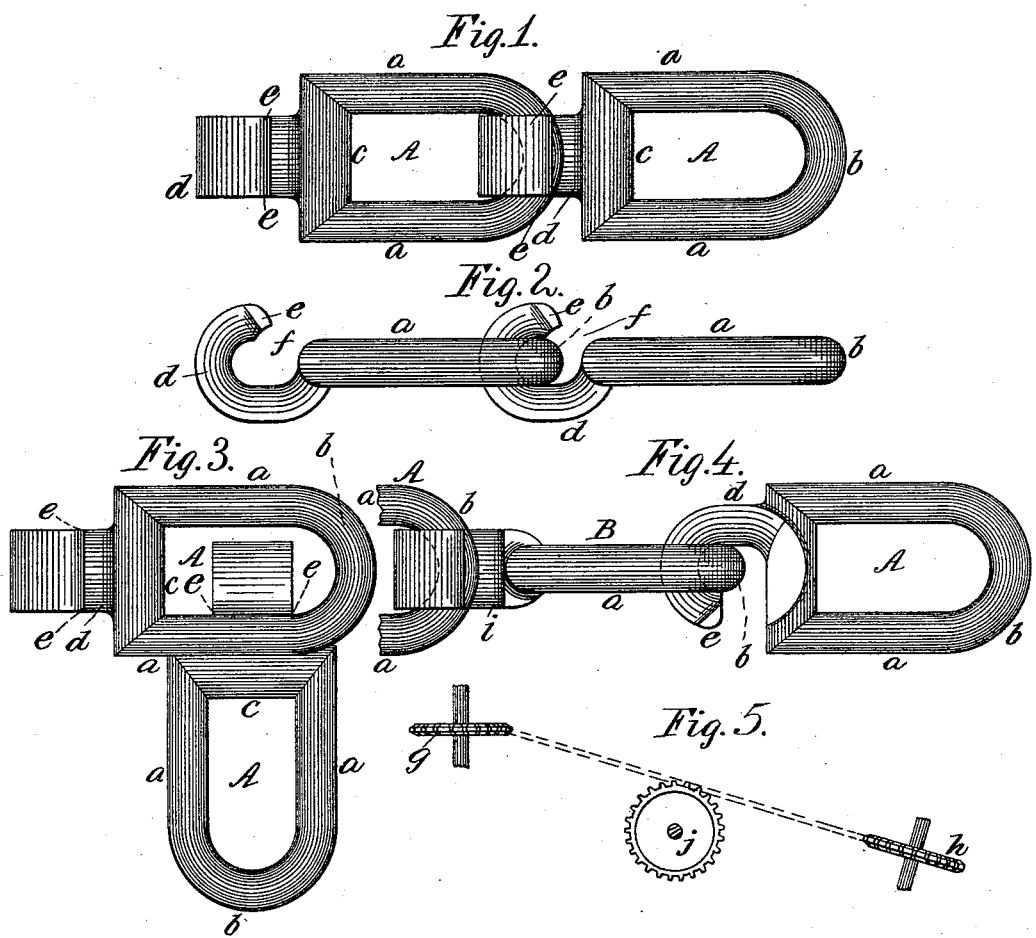
Witnesses:
W. C. Jirdinston.
Charles Billon
Inventor:
Henry J Gilbert
by Peck & Rector
his Attorneys.

UNITED STATES PATENT OFFICE.

HENRY J. GILBERT, OF SAGINAW, MICHIGAN.

DRIVE-CHAIN.

SPECIFICATION forming part of Letters Patent No. 454,998, dated June 30, 1891.

Application filed March 18, 1889. Serial No. 303,681. (No model.)

*To all whom it may concern:*

Be it known that I, HENRY J. GILBERT, a citizen of the United States, residing at Saginaw, in the county of Saginaw and State of Michigan, have invented certain new and useful Improvements in Drive-Chains, of which the following is a full, clear, and exact description, reference being had to the accompanying drawings, forming part of this specification.

My invention relates to that class of drive-chains known as "detachable chains;" and it has for its object the improved construction of such chains, whereby they may be rendered flexible in the plane of the links to enable them to drive sprockets at varying angles and out of the plane of the driving-sprocket as well as other features of improved construction.

The novelty of my invention will be herewith set forth, and distinctly pointed out in the claims.

In the accompanying drawings, Figure 1 is a plan view of two united links of a chain embodying my invention. Fig. 2 is a side elevation of the same. Fig. 3 is a plan view of the links in position for coupling and uncoupling. Fig. 4 represents a portion of a chain under a modified form of my invention. Fig. 5 is a diagram illustrating the out-of-line drive that can be accomplished by my improved chain.

The same letters of reference are used to indicate identical parts in all the figures.

A, Figs. 1, 2, and 3, represents the links of one form of my improved chain, each consisting of the straight side bars $a$, connected at one end by the rounded portion $b$ and at the other end by the straight portion $c$, from which latter extends a rounded connecting-hook $d$ of a width equal to the space between the bars $a$. This hook $d$ has its inner surface rounded off so as to snugly embrace the rounded portion $b$ of the next adjacent link; but its upper end is left full width, so as to form shoulders at $e$, thereby leaving a straight throat $f$. It results from this construction of links that they can only be coupled and uncoupled when the links are in the position shown in Fig. 3—that is to say, with the links at right angles to each other, and one of the straight bars $a$ lying over the throaf $f$, into which it is introduced, and the links can then be be drawn around into line, as seen in Fig. 1, and a lock be formed by the shoulders $e$ to prevent accidental uncoupling. It also results from this construction that the links are relatively flexible in their own planes because the rounded portion $b$ can slip freely around in the hook $d$ as well as hinging therein, as in other drive-chains that have not this feature of sidewise flexibility, and I am enabled, as seen in Fig. 7, to run the chain from the sprocket $g$ to the sprocket $h$, which sprockets are out of the same plane and at an angle to each other.

In the chain represented in Fig. 4 the hooks $d$ are turned sidewise to accommodate the rounded portions $b$ of intermediate links B at right angles to the links A, and which links B have their hooks $i$ so located as to embrace the next adjacent link A, thus enabling me not only to drive from $g$ to $h$, Fig. 5, with the links A, but also with the links B to drive an intermediate sprocket $j$, whose plane is at right angles to $g$ and $h$.

Having thus fully described my invention, I claim—

1. A drive-chain formed of a series of sprocket-links, each having straight sides and a rounded or outwardly-curved bar of uniform circumference throughout its length at one end, the opposite end bar being straight and provided with a hook having a rounded interior to snugly engage with the outwardly-curved end bar of the adjacent link, and a straight throat, the diameter of which is slightly greater than that of the side bar on which the hook is to be coupled, substantially as described, and for the purposes stated.

2. As an improvement in drive-chains, a detachable sprocket-link A, having straight sides $a$, a rounded or outwardly-curved end $b$, and a straight end $c$, from which projects a hook $d$, having a rounded interior and a straight throat, the throat of the hook being of less diameter than the outwardly-curved bar at the opposite end, constructed in the manner and for the purpose specified.

HENRY J. GILBERT.

Witnesses:
N. S. WOOD,
MARY C. FOWLER.